United States Patent
Hall et al.

(10) Patent No.: US 10,532,884 B2
(45) Date of Patent: Jan. 14, 2020

(54) MECHANICAL END EFFECTOR FOR PLANAR MOTION MECHANISM

(71) Applicants: David R. Hall, Provo, UT (US); Andrew Priddis, Mapleton, UT (US); Braquel Burnett, St. George, UT (US); Nathan Day, Provo, UT (US); Joe Fox, Spanish Fork, UT (US)

(72) Inventors: David R. Hall, Provo, UT (US); Andrew Priddis, Mapleton, UT (US); Braquel Burnett, St. George, UT (US); Nathan Day, Provo, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 254 days.

(21) Appl. No.: 15/603,867

(22) Filed: May 24, 2017

(65) Prior Publication Data
US 2018/0339857 A1    Nov. 29, 2018

(51) Int. Cl.
*B65G 1/04*    (2006.01)

(52) U.S. Cl.
CPC ..................... *B65G 1/04* (2013.01)

(58) Field of Classification Search
CPC .......................................................... B65G 1/04
See application file for complete search history.

(56) References Cited

U.S. PATENT DOCUMENTS

| | | | | |
|---|---|---|---|---|
| 7,815,017 B2 * | 10/2010 | Robbin | ............... | B65G 35/06 187/203 |
| 9,643,782 B1 * | 5/2017 | Hall | .................. | B65G 1/127 |
| 9,645,569 B1 * | 5/2017 | Hall | .................. | B65G 1/127 |
| 2008/0277243 A1 * | 11/2008 | Hayduchok | ....... | B07C 3/087 198/463.6 |
| 2015/0203294 A1 * | 7/2015 | Yamada | ........... | B65G 1/0407 294/81.6 |
| 2017/0073199 A1 * | 3/2017 | Kyotani | ........... | B66C 1/42 |
| 2017/0267452 A1 * | 9/2017 | Goren | .............. | B65G 1/0492 |
| 2017/0267469 A1 * | 9/2017 | Miyoshi | ........... | B65G 1/04 |
| 2017/0334643 A1 * | 11/2017 | Itoh | .................. | B65G 1/00 |
| 2018/0037410 A1 * | 2/2018 | DeWitt | ............. | B65G 1/0492 |
| 2018/0047591 A1 * | 2/2018 | Ogo | .................. | B65G 1/04 |
| 2018/0086557 A1 * | 3/2018 | Hall | .................. | B65G 1/06 |

(Continued)

FOREIGN PATENT DOCUMENTS

WO    WO-2017122483 A1 *    7/2017    .............. B65G 1/00

*Primary Examiner* — Saul Rodriguez
*Assistant Examiner* — Ashley K Romano

(57) ABSTRACT

The invention is a planar motion mechanism with a mechanical end effector. The mechanism has a vertical slide table that moves along one or more vertical tracks. The vertical slide table includes one or more horizontal tracks, an arcuate guide rail parallel to the horizontal tracks, and a horizontal slide table that moves along the horizontal tracks. The horizontal slide table comprises an end effector, which is a suspended perpendicular arm with a lip on the bottom edge that supports a load. The end effector, when unloaded, follows the path of the arcuate guide rail as the horizontal slide table moves along the one or more horizontal tracks. In this way, the end effector engages the load in positions near the edge of the arcuate guide rail, but in central positions along the arcuate guide rail, the end effector is distanced from the load so that it can freely maneuver.

20 Claims, 7 Drawing Sheets

(56) References Cited

U.S. PATENT DOCUMENTS

| | | | |
|---|---|---|---|
| 2018/0086608 A1* | 3/2018 | Miyoshi | B66C 13/22 |
| 2018/0105360 A1* | 4/2018 | Stordal | B65G 1/02 |
| 2018/0105365 A1* | 4/2018 | Levine | B65G 23/34 |
| 2018/0166908 A1* | 6/2018 | Wang | B65G 1/00 |
| 2018/0251299 A1* | 9/2018 | Ito | H01L 21/67265 |
| 2018/0327193 A1* | 11/2018 | Hamaguchi | B65G 1/00 |
| 2018/0333840 A1* | 11/2018 | Chahine | B25H 7/04 |
| 2019/0006217 A1* | 1/2019 | Motoori | B65G 1/00 |
| 2019/0084760 A1* | 3/2019 | Pape | F25D 25/00 |

\* cited by examiner

MECHANICAL END EFFECTOR FOR PLANAR MOTION MECHANISM

CROSS-REFERENCES

Technical Field

This invention relates generally to the field of robotics, and more specifically to end effectors.

BACKGROUND

Robots are simplifying everyday life by providing an efficient, automated means for performing many menial tasks. For example, one area in which robots have been advantageously utilized is in automated storage and retrieval systems. Using robots to automatically find and retrieve storage items from potentially distant or inaccessible storage areas has greatly simplified and improved storage systems.

However, in storage systems that utilize robots for finding and retrieving storage items, it is not always advantageous to control every aspect of the robot's function electronically. For example, some automated storage and retrieval systems use robots that move planarly, lifting and repositioning inventory items across two dimensions. These systems may use end effectors that handle and manipulate the items. In such systems, in which the end effector is constantly moving across two planes, providing electrical power specifically to the end effector could require a wired power supply, and it can be very difficult to keep the wired supply from becoming twisted, tangled, or otherwise damaged during normal operations of the robot. This problem may be solved by means of an electronic robot with a strictly mechanical end effector.

Utilizing a strictly mechanical end effector presents another challenge, however. The end effector needs to be able to connect with a target storage item at an appropriate time, and yet it also needs to be able to maneuver freely around storage items. Protrusions that would usually aid the mechanical end effector in connecting to target storage items could impede its free movement.

In light of the foregoing, what is needed is a system that allows a strictly mechanical end effector to connect to only the appropriate target storage item at the appropriate time without the use of a protruding member, such that the end effector can freely maneuver between storage items.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for a planar motion mechanism with a mechanical end effector that can attach to an item without the need for a horizontally protruding member on the item.

Consistent with the foregoing, a planar motion mechanism is disclosed. The planar motion mechanism comprises one or more vertical tracks and a vertical slide table that moves along the vertical tracks. The vertical slide table comprises one or more horizontal tracks, an arcuate guide rail parallel to the one or more horizontal tracks, and a horizontal slide table that moves along the horizontal tracks. The horizontal slide table comprises a suspended perpendicular arm, which has a basal lip that supports a positionable load. The suspended perpendicular arm, when unloaded, engages the arcuate guide rail as the horizontal slide table moves along the one or more horizontal tracks.

In one embodiment, the planar motion mechanism is an H-bot. In some embodiments, the planar motion mechanism is electromechanical, including two or more motors that drive the vertical and horizontal slide tables, and the two or more motors may be connected to the vertical and horizontal slide tables by a belt and a pulley system. The motors may be controlled by one or more microcontrollers. The positionable load may be a storage bin or an electrical appliance, and the planar motion mechanism may be one component in an automated storage and retrieval system.

The suspended perpendicular arm is an end effector, and it may comprise a long metal slat in a T-shape. The suspended perpendicular arm may further comprise a spring and a hinge. A force provided by the spring causes the suspended perpendicular arm, when unloaded, to engage the arcuate guide rail as the horizontal slide table moves along the one or more horizontal tracks. The suspended perpendicular arm does not engage the arcuate guide rail at its central point when the suspended perpendicular arm is loaded.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

A planar motion mechanism is a device that is capable of movement in two dimensions, the movement in each of the dimensions being controlled by an actuator. Planar motion mechanisms are commonly used in many applications. For example, one common type of planar motion mechanism is an H-bot, which may be used in 3-D printing. The instant invention is a planar motion mechanism with a mechanical end effector that can attach to an item without the need for a horizontally protruding member on the item.

Figure 1:
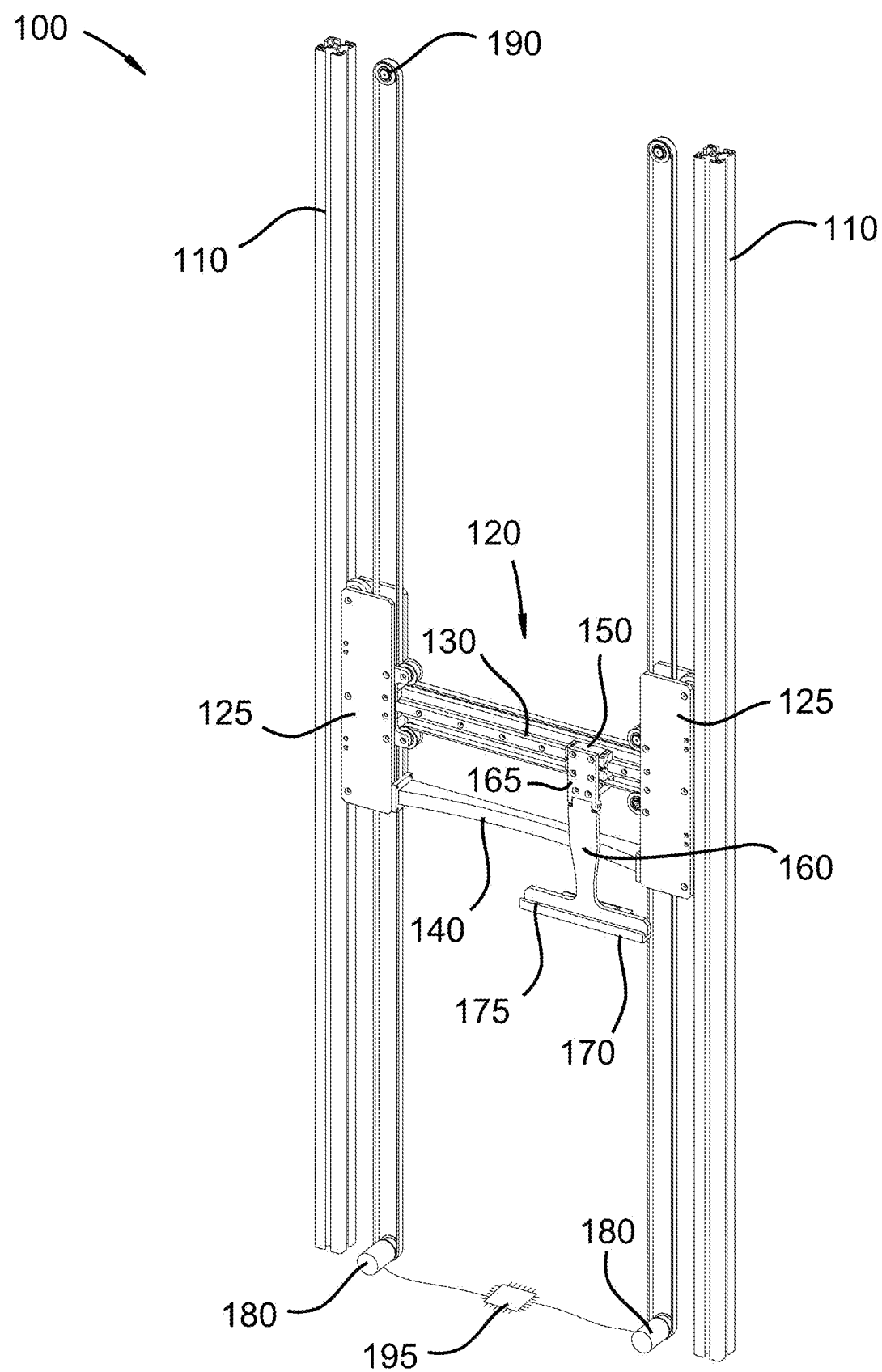
FIG. 1 depicts a front view of one embodiment of the invented planar motion mechanism.

FIG. 1 depicts a front view of one embodiment of the invented planar motion mechanism 100. In one embodiment, the planar motion mechanism 100 is an H-bot. The invented planar motion mechanism 100 comprises one or more vertical tracks 110 and a vertical slide table 120 that moves along the vertical tracks 110. In different embodiments, the vertical slide table 120 moves along the one or more vertical tracks 110 by means of wheels or bearing blocks. In one embodiment, there are two vertical tracks 110 that are spaced apart at a distance equal to the width of the vertical slide table 120. In another embodiment, there is one vertical track 110 on which the vertical slide table 120 is centered. In other embodiments, there are more than two vertical tracks 110. The one or more vertical tracks 110 may be stood upright in different embodiments by being attached by means of fasteners to an upright frame or a wall or another upright structure. In one embodiment, the one or more vertical tracks 110 comprise lightweight metal.

The vertical slide table 120 comprises one or more horizontal tracks 130, an arcuate guide rail 140 parallel to the one or more horizontal tracks 130, and a horizontal slide table 150 that moves along the horizontal tracks 130. In one embodiment, the arcuate guide rail 140 comprises a metal bar in the shape of an arch, with a flat front surface. In one embodiment, the arcuate guide rail 140 is positioned below, and parallel to, the one or more horizontal tracks 130. In one embodiment, the vertical slide table 120 comprises two end members 125 that move along two vertical tracks 110, and the arcuate guide rail 140 and the one or more horizontal tracks 130 stretch between the two end members 125 of the vertical slide table 120. In one embodiment, there is one horizontal track 130. Other embodiments comprise more than one horizontal track 130. In one embodiment, each horizontal track 130 comprises lightweight metal. In different embodiments, the horizontal slide table 150 moves along the one or more horizontal tracks 130 by means of wheels or bearing blocks.

The horizontal slide table 150 comprises a suspended perpendicular arm 160 that comprises a basal lip 170 that supports a positionable load. The suspended perpendicular arm 160 is the end effector. In one embodiment, the suspended perpendicular arm 160 is a long metal slat. In one embodiment, the suspended perpendicular arm 160 comprises an upside-down T-shape. In this embodiment, the bottom of the suspended perpendicular arm 160 has a member that extends outward in both horizontal directions. In one embodiment, the suspended perpendicular arm 160 hangs vertically from the horizontal slide table 150, and preferably, in a fixed position, not loosely or flexibly. In one embodiment, the suspended perpendicular arm 160 is attached to the horizontal slide table 150 by means of one or more fasteners 165. The basal lip 170 of the suspended perpendicular arm 160 is a flange that protrudes horizontally at the bottom of the suspended perpendicular arm 160. In one embodiment, the basal lip 170 is flat and level. The basal lip 170 supports a positionable load. The basal lip 170 must protrude horizontally to an extent that allows it, perhaps in concert with the basal lip 170 of a second planar motion mechanism 100, to support a positionable load, which it may do by sliding underneath the positionable load and lifting the positionable load up from the bottom. In one embodiment, the basal lip 170 also comprises a vertical flange 175. The addition of the vertical flange 175 creates a hook shape of the basal lip 170. In one embodiment, the basal lip 170 is designed so as to engage with a basal extension on a positionable load. The suspended perpendicular arm 160, when unloaded, engages the arcuate guide rail 140 as the horizontal slide table 150 moves along the one or more horizontal tracks 130. In one embodiment, the arcuate guide rail 140 is positioned below the horizontal tracks 130. In one embodiment, the arcuate guide rail 140 is positioned below the horizontal tracks 130 at a distance between a hinge of the suspended perpendicular arm 160 and the basal lip 170 of the suspended perpendicular arm 160. In one embodiment, the arcuate guide rail 140 is concave or partially concave in relation to the suspended perpendicular arm 160.

In one embodiment, the invented planar motion mechanism 100 is electromechanical. In one embodiment, the planar motion mechanism 100 also comprises two or more motors 180 that drive the vertical slide table 120 and the horizontal slide table 150. In one embodiment, the planar motion mechanism 100 comprises a belt and a pulley system 190 that connects the two or more motors 180 to the vertical slide table 120 and the horizontal slide table 150. In one embodiment, the two or more motors 180 are controlled by one or more microcontrollers 195. The one or more microcontrollers 195 may be programmed such that the planar motion mechanism 100 operates automatically to perform particular functions.

Figure 2:
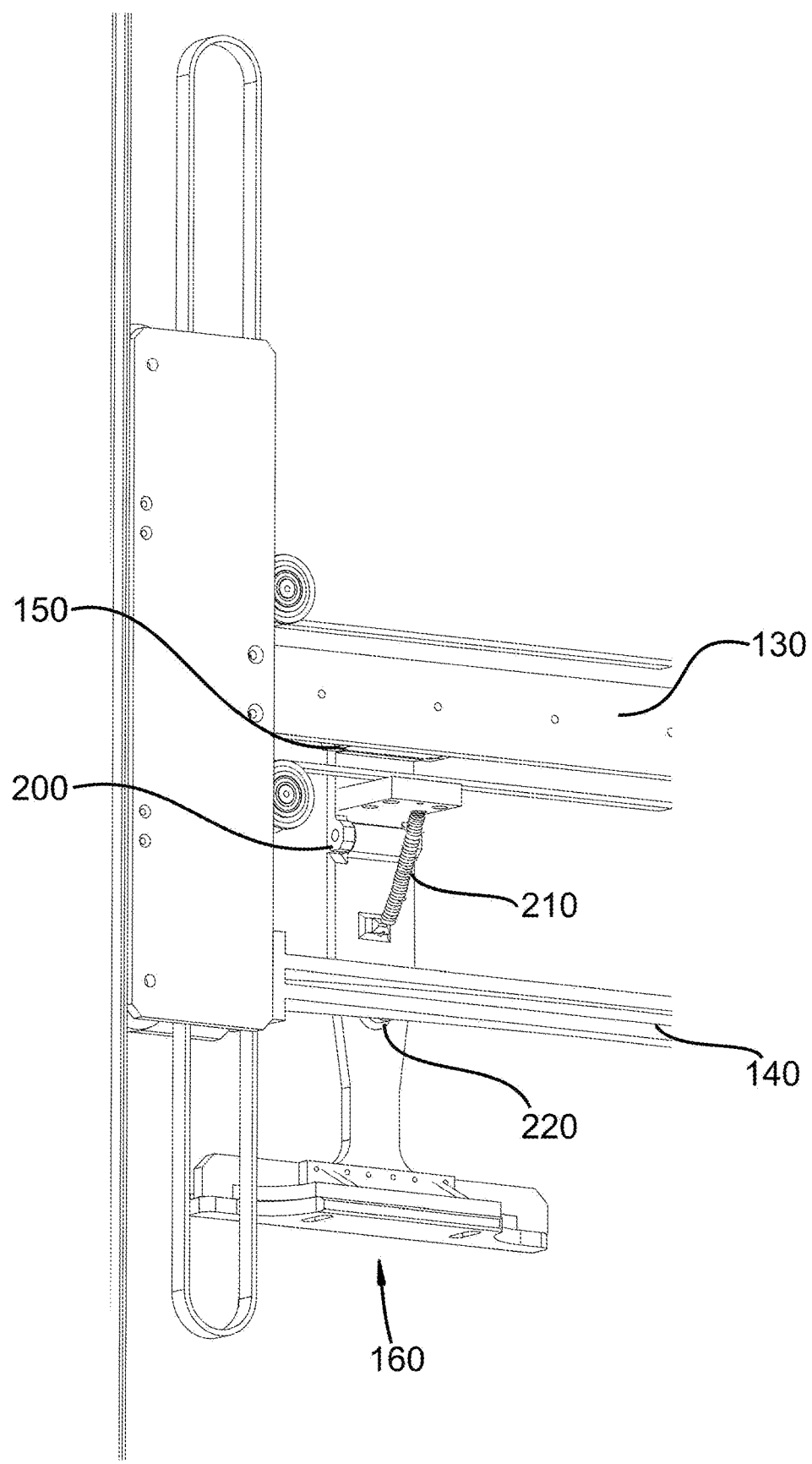
FIG. 2 depicts a back view of one embodiment of the suspended perpendicular arm.

FIG. 2 depicts a back view of one embodiment of the suspended perpendicular arm 160. In one embodiment, the suspended perpendicular arm 160 comprises a spring 210. In one embodiment, the spring 210 is attached to a back side of the suspended perpendicular arm 160 on one end and to a stationary position in relation to the one or more horizontal tracks 130 on another end. In one embodiment, a force provided by the spring 210, which pulls the suspended perpendicular arm 160 backwards towards the one or more horizontal tracks 130 and the arcuate guide rail 140, causes the suspended perpendicular arm 160, when unloaded, to engage the arcuate guide rail 140 as the horizontal slide table 150 moves along the one or more horizontal tracks 130. In this way, the suspended perpendicular arm 160 follows an arched path as it moves horizontally side to side, following the shape of the arcuate guide rail 140. In one embodiment, a knob 220 on the back of the suspended perpendicular arm 160 that engages the arcuate guide rail 140 allows the suspended perpendicular arm 160 to follow the path of the arcuate guide rail 140 while maintaining a level front face. When the suspended perpendicular arm 160 moves to an extreme left or right of the arcuate guide rail 140, the suspended perpendicular arm 160 will be in position to engage a positionable load, to lift and support it. However, when the suspended perpendicular arm 160 is in a central position along the arcuate guide rail 140, the suspended perpendicular arm 160 is slightly distanced from the positionable load, so that it can move freely up and down without inadvertently engaging the positionable load. This allows the suspended perpendicular arm 160 to maneuver freely around one or several positionable loads and yet still be able to engage and lift one or several positionable loads without the loads having a horizontally protruding attachment point. In one embodiment, the suspended perpendicular arm 160 further comprises a hinge 200. In one embodiment, the arcuate guide rail 140 is positioned below the horizontal tracks 130 at a distance between the hinge 200 of the suspended perpendicular arm 160 and the basal lip 170 of the suspended perpendicular arm 160. The hinge 200 allows the suspended perpendicular arm 160 to flex outward and away from the arcuate guide rail 140 when the suspended perpendicular arm 160 is loaded. When the suspended perpendicular arm 160 is loaded, the weight of the positionable load offsets the force of the spring 210 so that the suspended perpendicular arm 160 maintains a linear path as the horizontal slide table 150 moves horizontally side to side, rather than following the arched path of the arcuate guide rail 140.

Figure 3:
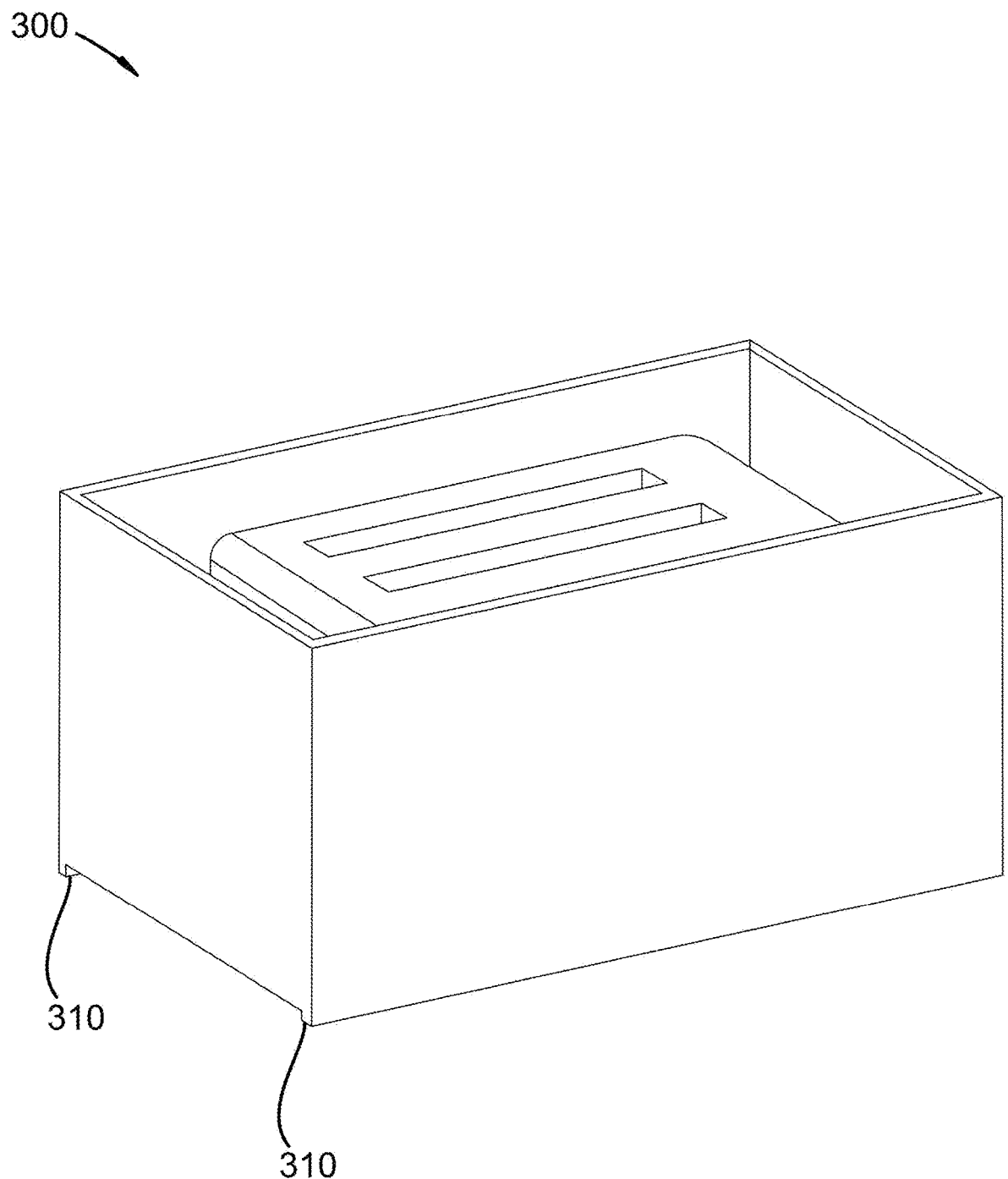
FIG. 3 depicts one embodiment of a positionable load.

FIG. 3 depicts one embodiment of a positionable load 300. In one embodiment, the positionable load 300 comprises at least one basal extension 310 that engages the basal lip 170 of the suspended perpendicular arm 160. In one embodiment, the at least one basal extension 310 is a protrusion at the bottom of the positionable load 300, where vertical walls of the positionable load 300 extend slightly beyond a point where the vertical walls meet horizontal walls of the positionable load 300. In one embodiment, the positionable load 300 comprises a rectangular prismatic configuration, although many other configurations are possible. In one embodiment, the positionable load 300 measures approximately twelve inches tall, twelve inches deep, and twenty inches wide. These uniform dimensions allow the positionable load 300 to function within an automated storage and retrieval system, as will be explained in detail below. In one embodiment, the positionable load 300 comprises a storage bin, which may be open at the top or open at the front. In one embodiment, the positionable load 300 comprises an electrical appliance, which may be selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. In one embodiment, the positionable load 300 comprises a lightweight metal, such as aluminum, magnesium, titanium, beryllium alloys, or combinations thereof. In another embodiment, the positionable load 300 comprises plastic. In one embodiment, the positionable load 300 weighs up to 20 pounds, an amount which can be supported by the suspended perpendicular arm 160. Several positionable loads 300 may be arranged in one or more columns within an automated storage and retrieval system to interact with one or more of the invented planar motion mechanisms 100.

Figure 4A:
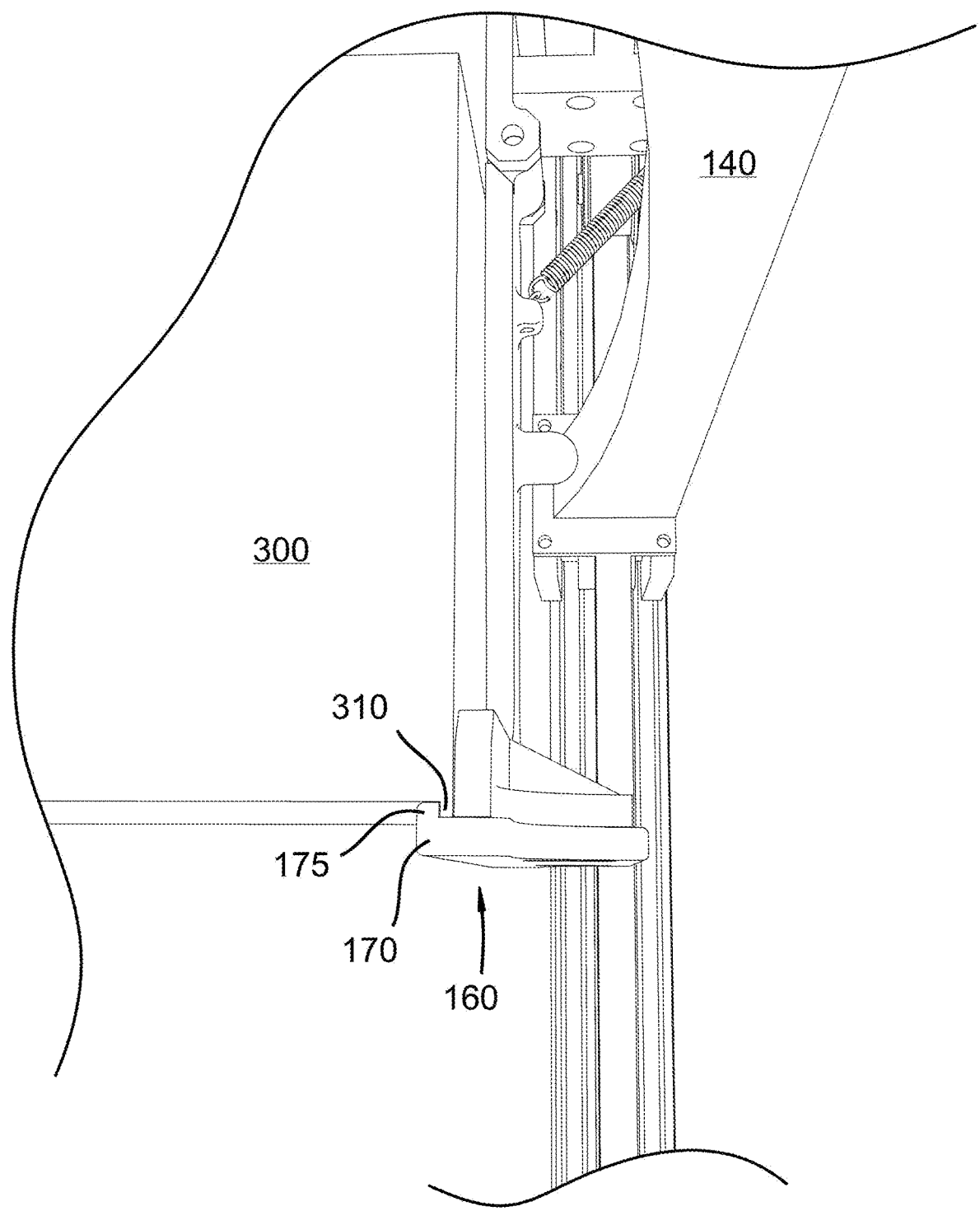
FIG. 4A depicts one embodiment of the suspended perpendicular arm engaging a positionable load.

FIG. 4A depicts one embodiment of the suspended perpendicular arm 160 engaging a positionable load 300. The suspended perpendicular arm, 160, when unloaded, engages the arcuate guide rail 140 as the horizontal slide table 150 moves along the one or more horizontal tracks 130. In one embodiment, the arcuate guide rail 140 is concave or partially concave in relation to the suspended perpendicular arm 160. Because the unloaded suspended perpendicular arm 160 follows the arched path of the arcuate guide rail 140, the position of the suspended perpendicular arm 160 in relation to an adjacent positionable load 300 changes. Specifically, when the suspended perpendicular arm 160 moves to an extreme left or right of the arcuate guide rail 140, the suspended perpendicular arm 160 is closer to the positionable load 300 than when the suspended perpendicular arm 160 is in a central position along the arcuate guide rail 140. When an unloaded suspended perpendicular arm 160 moves to an extreme left or right of the arcuate guide rail 140, the suspended perpendicular arm 160 is tangent to the positionable load 300, in a position to engage the positionable load 300, to lift and support it. The suspended perpendicular arm 160 comprises a basal lip 170 that supports the positionable load 300. In one embodiment, the basal lip 170 is flat and level. In one embodiment, the basal lip 170 slides underneath the positionable load 300 when the suspended perpendicular arm 160 moves to an extreme left or right of the arcuate guide rail 140, and the basal lip 170 lifts the positionable load 300 up from the bottom to support it. In one embodiment, the positionable load 300 comprises a basal extension 310 that engages the basal lip 170. In one embodiment, the basal lip 170 is designed so as to engage with the basal extension 310 on the positionable load 300. In one embodiment, the basal lip 170 comprises a vertical flange 175. The addition of the vertical flange 175 creates a hook shape of the basal lip 170, which allows the basal lip 170 to have a more secure connection to the positionable load 300. In one embodiment, the positionable load 300 is one component in an automated storage and retrieval system. In one embodiment, several positionable loads 300 may be arranged in one or more columns within an automated storage and retrieval system to interact with one or more of the invented planar motion mechanisms 100. In one embodiment, the suspended perpendicular arm 160 engages each of the positionable loads 300 to lift and reposition the positionable loads 300 within the automated storage and retrieval system.

Figure 4B:
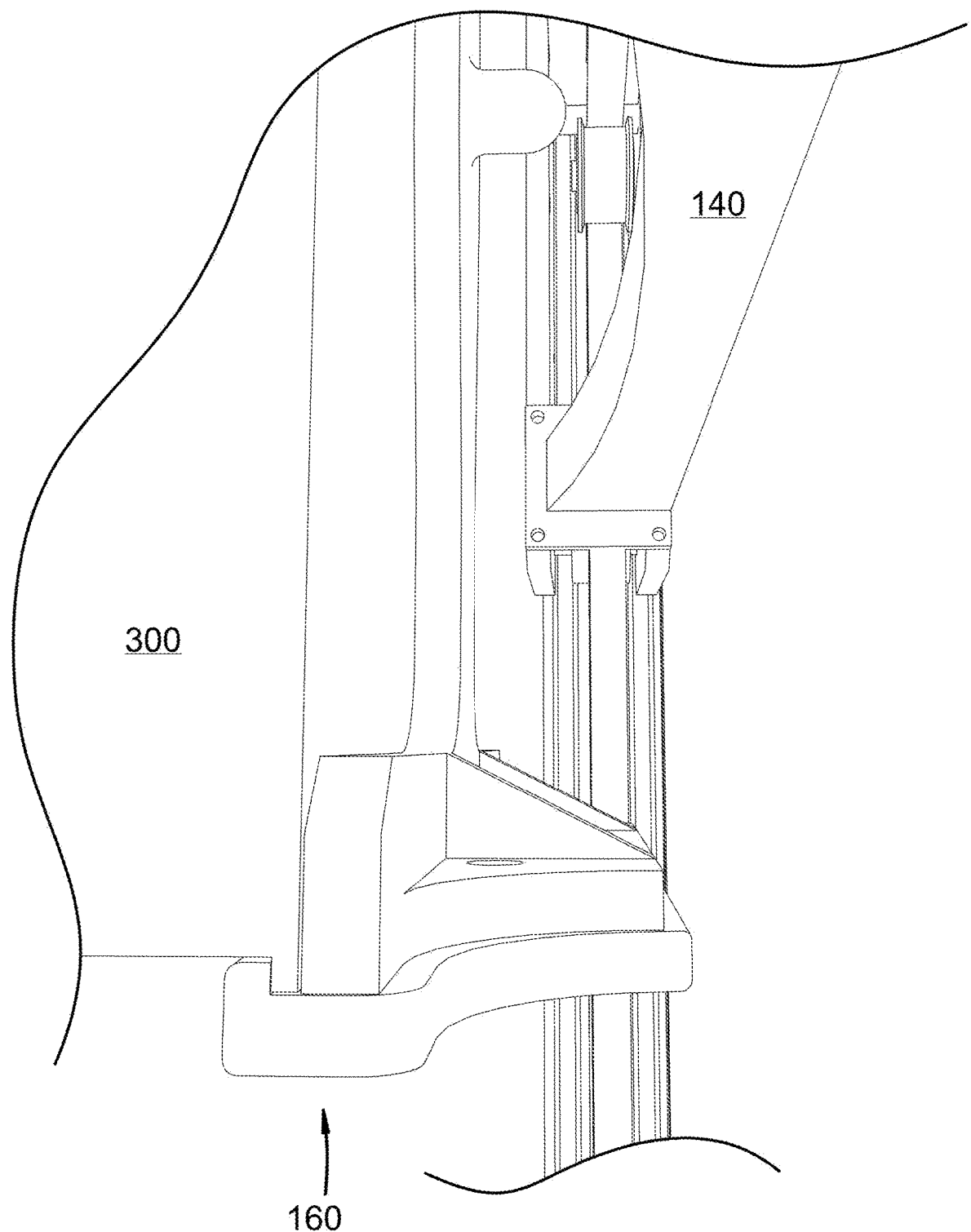
FIG. 4B depicts one embodiment of the suspended perpendicular arm supporting a positionable load.

FIG. 4B depicts one embodiment of the suspended perpendicular arm 160 supporting a positionable load 300. In one embodiment, the suspended perpendicular arm 160 comprises a hinge 200 and a spring 210. In one embodiment, a force provided by the spring 210, which pulls the suspended perpendicular arm 160 backwards towards the one or more horizontal tracks 130 and the arcuate guide rail 140, causes the suspended perpendicular arm 160, when unloaded, to engage the arcuate guide rail 140 as the horizontal slide table 150 moves along the one or more horizontal tracks 130. In this way, the suspended perpendicular arm 160, when unloaded, follows an arched path as it moves horizontally side to side, following the shape of the arcuate guide rail 140. The hinge 200 allows the suspended perpendicular arm 160 to flex outward and away from the arcuate guide rail 140 when the suspended perpendicular arm 160 is loaded. When the suspended perpendicular arm 160 is loaded, the weight of the positionable load 300 offsets the force of the spring 210 so that the suspended perpendicular arm 160 maintains a linear path as the horizontal slide table 150 moves horizontally side to side, rather than following the arched path of the arcuate guide rail 140.

Figure 4C:
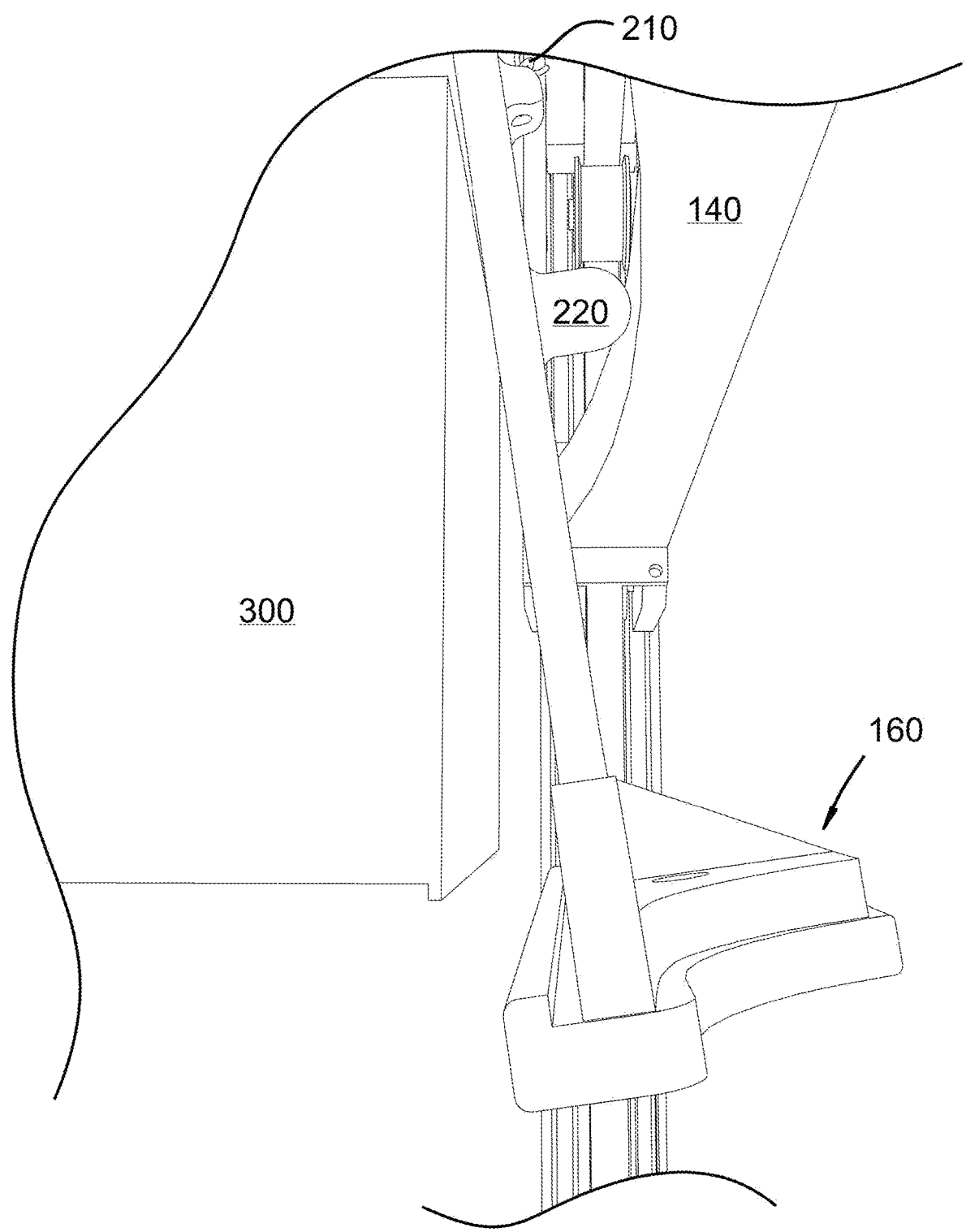
FIG. 4C depicts one embodiment of the suspended perpendicular arm, when unloaded, engaging the arcuate guide rail as the horizontal slide table moves along the one or more horizontal tracks.

FIG. 4C depicts one embodiment of the suspended perpendicular arm 160, when unloaded, engaging the arcuate guide rail 140 as the horizontal slide table 150 moves along the one or more horizontal tracks 130. In one embodiment, the arcuate guide rail 140 is concave or partially concave in relation to the suspended perpendicular arm 160. The suspended perpendicular arm 160 follows an arched path as it moves horizontally side to side, following the shape of the arcuate guide rail 140. In one embodiment, the force of a spring 210 on the suspended perpendicular arm 160 pulls the suspended perpendicular arm 160 against the arcuate guide rail 140 so that it engages the arcuate guide rail 140 as it moves. In one embodiment, a knob 220 on the back of the suspended perpendicular arm 160 allows the suspended perpendicular arm 160 to engage and follow the path of the arcuate guide rail 140 while maintaining a level front face. Because the unloaded suspended perpendicular arm 160 follows the arched path of the arcuate guide rail 140, the position of the suspended perpendicular arm 160 in relation to an adjacent positionable load 300 changes. When the suspended perpendicular arm 160 moves to an extreme left or right of the arcuate guide rail 140, the suspended perpendicular arm 160 will be in position to engage a positionable load 300, to lift and support it. However, when the suspended perpendicular arm 160 is in a central position along the arcuate guide rail 140, as depicted in FIG. 4C, the suspended perpendicular arm 160 is slightly distanced from the positionable load 300, so that it can move freely up and down without inadvertently engaging the positionable load 300. This allows the suspended perpendicular arm 160 to maneuver freely around one or several positionable loads 300 and yet still be able to engage and lift one or several positionable loads 300 without the positionable loads 300 having horizontally protruding attachment points. This is especially important in an automated storage and retrieval system, in which the suspended perpendicular arm 160 needs to maneuver around and lift and reposition numerous positionable loads 300 that are arranged very close to each other in vertical columns. Furthermore, the nature of the suspended perpendicular arm 160 and its arched path allows the end effector of the invented planar motion mechanism to be strictly mechanical, such that the planar motion mechanism 100 is able to maneuver easily, given that it requires no complicated onboard wiring.

Figure 5:
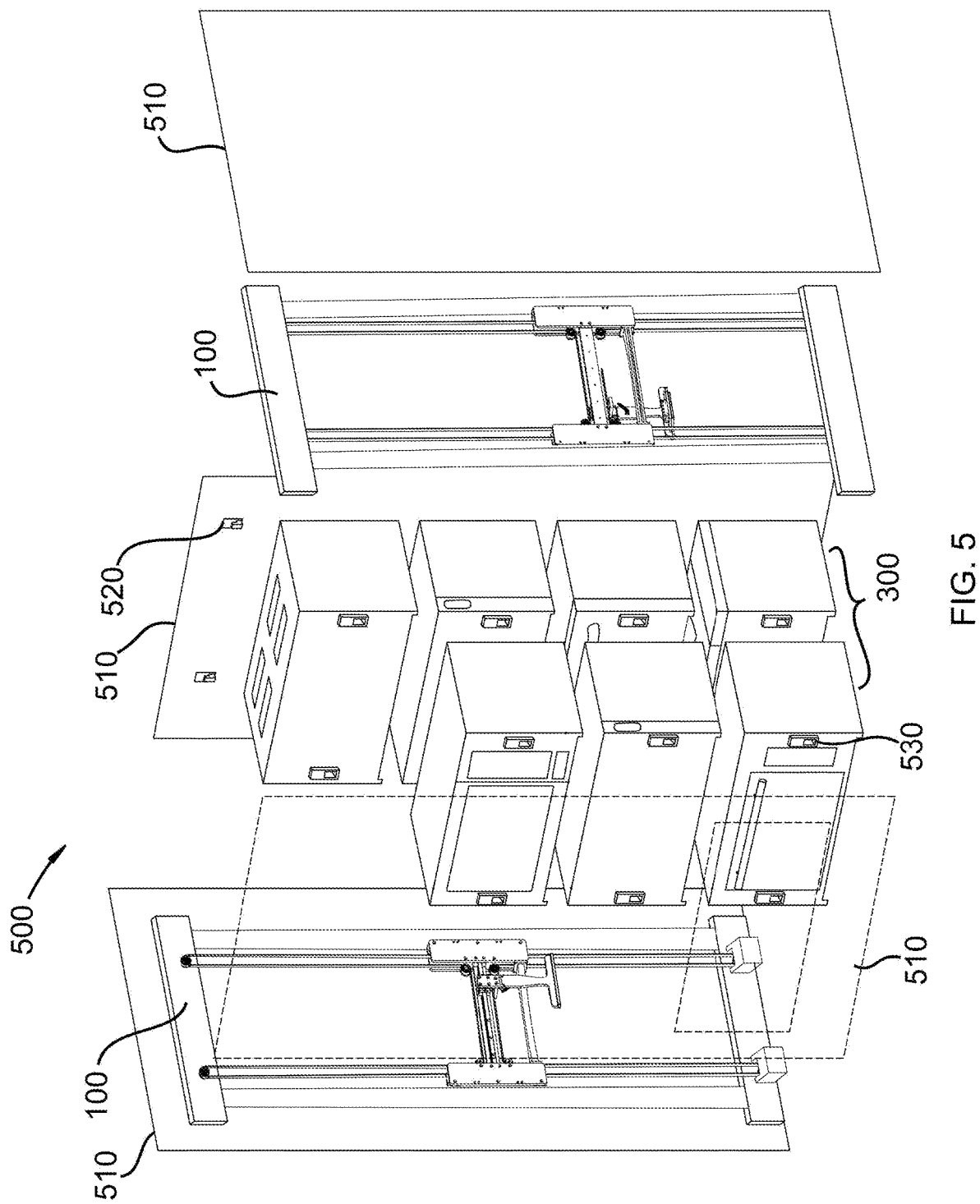
FIG. 5 depicts one embodiment of the invented planar motion mechanism as one component in an automated storage and retrieval system.

FIG. 5 depicts one embodiment of the invented planar motion mechanism 100 as one component in an automated storage and retrieval system 500. In different embodiments, the automated storage and retrieval system is that which is described in Automatic Storage and Retrieval System with Planar Motion Mechanism, patent specification No. U.S. Ser. No. 15/248,589; Automated Storage and Retrieval Direct Movement Method, patent specification No. U.S. Ser. No. 15/260,979; or Automated Storage and Retrieval System with Retractable Mountings, patent specification No. U.S. Ser. No. 15/278,545, which are commonly owned by the Applicant and incorporated by reference for all that they teach. In one embodiment, the automated storage and retrieval system 500 comprises one or more of the invented planar motion mechanisms 100 movably mounted to a frame 510. The automated storage and retrieval system 500 further comprises one or more connectors 520 mounted to one or more walls of the frame 510. Suspended from each set of two connectors 520 is one positionable load 300. The one or more planar motion mechanisms 100 suspend the one or more positionable loads 300 from the one or more connectors 520 and reposition the one or more positionable loads within the frame 510. In one embodiment, each positionable load 300 measures approximately twelve inches tall, twelve inches deep, and twenty inches wide. A positionable load 300 of this size is dimensioned to fit especially within the cited automated storage and retrieval systems, which are designed to fit within condensed kitchens. In one embodiment, each positionable load 300 comprises at least one electrically conductive member 530. In one embodiment, each connector 520 is electrically conductive, providing electrical power to each positionable load 300 when engaging with the at least one electrically conductive member 530 of each positionable load 300.

The invention claimed is:

1. A planar motion mechanism comprising:
   first and second vertical tracks; and
   a vertical slide table that moves up and down along the first and second vertical tracks, the vertical slide table comprising:
     a first slider that engages the first vertical track;
     a second slider that engages the second vertical track;
     a horizontal track that extends from the first slider to the second slider;
     an arcuate guide rail parallel to the horizontal track that extends from the first slider to the second slider; and
     a horizontal slide table that moves side to side along the horizontal track, the horizontal slide table comprising a suspended arm comprising a basal lip that supports a positionable load,
   wherein the suspended arm, when unloaded, maintains contact with the arcuate guide rail as the horizontal slide table moves side to side along the horizontal track.

2. The planar motion mechanism of claim 1, further comprising two or more motors that drive the vertical slide table and the horizontal slide table.

3. The planar motion mechanism of claim 2, further comprising a belt and a pulley system that connects the two or more motors to the vertical slide table and the horizontal slide table.

4. The planar motion mechanism of claim 2, wherein the two or more motors are controlled by one or more microcontrollers.

5. The planar motion mechanism of claim 1, wherein the planar motion mechanism is an H-bot.

6. The planar motion mechanism of claim 1, wherein the planar motion mechanism is one component in an automated storage and retrieval system.

7. The planar motion mechanism of claim 1, wherein the positionable load comprises a storage bin.

8. The planar motion mechanism of claim 1, wherein the positionable load comprises an electrical appliance.

9. The planar motion mechanism of claim 1, wherein the positionable load comprises at least one basal extension that engages the basal lip.

10. The planar motion mechanism of claim 1, wherein the basal lip comprises a vertical flange.

11. The planar motion mechanism of claim 1, wherein the suspended arm comprises a long metal slat.

12. The planar motion mechanism of claim 1, wherein the suspended arm comprises an upside-down T-shape.

13. The planar motion mechanism of claim 1, wherein the suspended arm comprises a hinge.

14. The planar motion mechanism of claim 1, wherein the suspended arm comprises a spring.

15. The planar motion mechanism of claim 14, wherein a force provided by the spring causes the suspended arm, when unloaded, to maintain contact with the arcuate guide rail as the horizontal slide table moves side to side along the horizontal track.

16. The planar motion mechanism of claim 1, wherein the suspended arm flexes outward and away from the arcuate guide rail when the suspended arm is loaded.

17. The planar motion mechanism of claim 1, wherein the arcuate guide rail is positioned below the horizontal track.

18. The planar motion mechanism of claim 13, wherein the arcuate guide rail is positioned below the horizontal track between the hinge and the basal lip of the suspended arm.

19. The planar motion mechanism of claim 1, wherein the arcuate guide rail is concave in relation to the suspended arm.

20. The planar motion mechanism of claim 1, wherein the arcuate guide rail is partially concave in relation to the suspended arm.

* * * * *